April 11, 1950         J. EPSTEIN         2,504,070
DISCHARGE VALVE FOR MASH TUBS
Filed Aug. 20, 1948
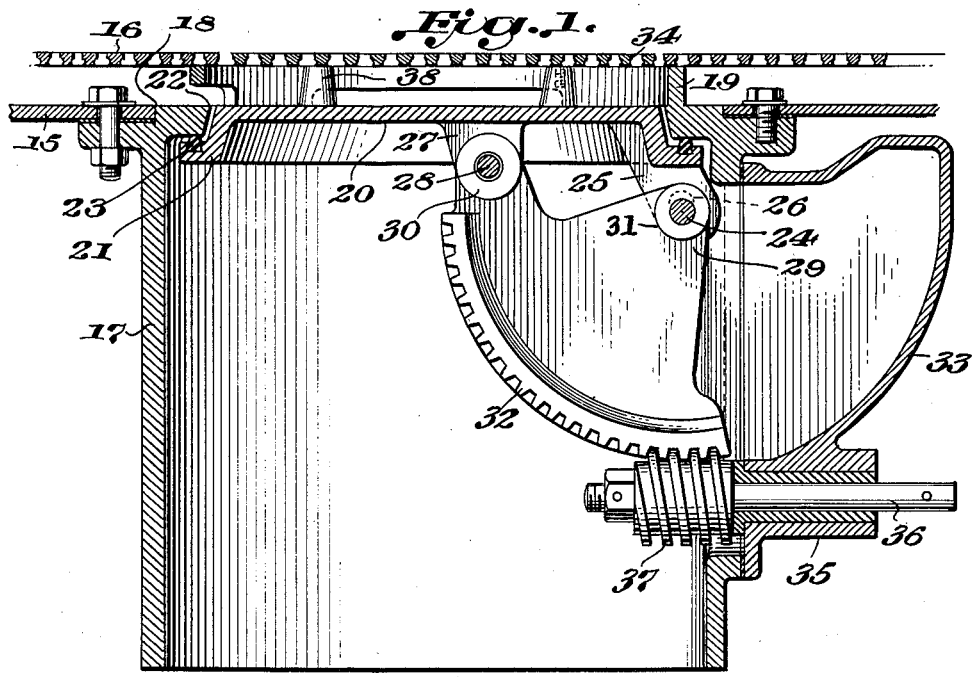
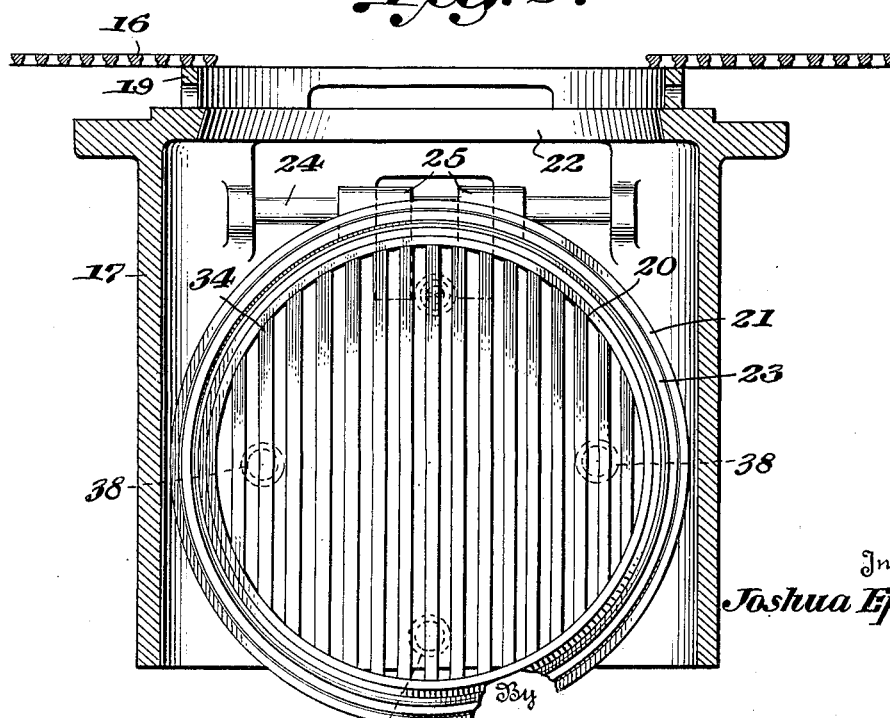
Inventor
Joshua Epstein
By
Mason, Pates, Miller & Stewart
ATTORNEYS Patented Apr. 11, 1950

2,504,070

UNITED STATES PATENT OFFICE 2,504,070

DISCHARGE VALVE FOR MASH TUBS

Joshua Epstein, Philadelphia, Pa., assignor to Acme Coppersmithing and Machine Company, Oreland, Pa., a corporation of Pennsylvania Application August 20, 1948, Serial No. 45,408

6 Claims. (Cl. 137—21)

The specification which follows relates to improvements in lauter tubs, mash tubs and other similar vessels from which liquids are to be drained prior to the discharge of solids. Specifically, the improvement is in the arrangement of the discharge valve and related parts.

In the mashing of grain and the like, after the steeping operation, the wort is required to be drained off of the spent grains without undue disturbance of the latter. It is then necessary to discharge the solid granular mass from the tub, vat or the like. Ordinarily, the space occupied by the discharge valve diminshes the effective area over which the draining and filtering operation takes place. It also establishes a depression for the accumulation of liquid instead of its drainage with the remainder.

According to the invention herein, a discharge valve for the tub or tank is provided to permit the entire bottom surface of the tub to be effective for filtering purposes.

At the same time, provision is made to insure that all liquids draining into the false bottom above the discharge valve will be carried off with the remainder of the filtered liquid.

A further object of the invention is to maintain a false bottom substantially continuous over the entire area of the tub without permitting any undesirable accumulation of liquid over the valve itself.

Other objects of the invention will be apparent from the description which follows of the preferred form of my invention. This preferred form is shown in the accompanying drawings in which:

Fig. 1 is a vertical cross-section of the improved discharge valve and lauter tank, and Fig. 2 is a vertical cross-section of the discharge valve or trap in its open position, and at right angles to the plane of Fig. 1.

Briefly considered, the invention consists in providing a false bottom for the lauter tank over the entire area of the latter. This includes the space above the gate valve so that maximum drainage is carried out. The false bottom is in the form of a grid or screen which is divided into sections each superimposed upon a drainage unit of the tank.

The area over the discharge valve or trap has a grid false bottom in the plane of the remainder of the tank bottom. This grid is spaced above and supported by the valve itself. The upper face of the valve is flush with the adjacent portions of the tank bottom and thus is drained without risk of accumulating liquid and sediment. The grid element above the valve is arranged to be dropped when the valve is lowered into open position and thus permits free discharge of the granular material from above the false bottom.

In the drawings I have shown, the bottom 15 of a mash tub or lauter tank. The tank bottom 15 carries a rigid grid or screen 16. This grid is composed of a number of sectoral sections.

A discharge pipe 17 is bolted or otherwise fastened in an opened 18 of the bottom 15. The corresponding segment or segments of the grid 16 are cut away to leave the area above the opening free. A rib 19 fits around the opening of the discharge pipe 17 and is arched or apertured to permit free movement of liquid over the valve space. The rib supports the grid around the opening.

A disk valve 20 either circular or rectangular, is provided to fit loosely within the opening of the discharge pipe. The disk has a depressed rim 21 for engagement with the flange 22 of the discharge pipe. A gasket 23 seals the rim to the flange when the valve is closed.

A hinge pin 24 is rotatably mounted at one side of the discharge pipe. This hinge pin carries a pair of ears depending from the valve disk 20. These ears are elongated vertically as shown in dotted line on Fig. 4 in order to permit the valve to be raised vertically in its final sealing movement after having been brought into horizontal position.

A pair of lugs 27 are provided on the bottom face of the disk 20. A pivot pin 28 is carried by the lugs.

The hinge pin 24 also forms a journal bearing for a gear sector 29. One end of this sector has an eye 30 loosely carried by the hinge pin 28. Centrally of the sector is an eye 31 also carried on the hinge pin 24. The outer circular edge of the sector has a series of gear teeth 32.

A housing 33 is fitted around a vertical opening in the side of the discharge pipe 17, opposite the gear sector 29. This housing receives the gear when the valve is open, and prevents escape of the material laterally from the pipe 17.

The lower part of the housing 33 carries a journal bearing 35 in which there is provided a shaft 36. At the inner end of the shaft there is a worm gear splined to the shaft engaging the teeth 32 of the gear sector. The shaft is rotated manually from the outside by means which are not illustrated in detail.

The upper surface of the disk 20 is provided with spaced lugs 38. These lugs carry a grid section conforming to the shape of the tank and the corresponding opening in the screen of the grid 16. As shown in Fig. 1, the grid 34 is in the plane with the screen 16 and fits closely to it.

The design of the filtering tub as described in detail above permits drainage of the liquid over the entire bottom area and without any loss of efficiency due to the presence of the clean-out gate valve.

The grid mounted above the discharge valve permits the liquid to drain off over this area. At the same time, since the top of the valve is flush with the bottom of the tank, the liquid and any sediment will be carried away without settling. Also, none can collect and be lost with the grains when the gate valve is dropped.

The operative arrangement of the gate valve permits easy opening. In the closing movement, the valve moves bodily upwardly due to the elongated pivotal connection.

This arrangement of false bottom and gate valve is a rugged construction and economical to manufacture. It gives the maximum straining effect. At the same time, the spent grain may be rapidly discharged through the gate valve when open. While I have illustrated and described the preferred form of the invention, it has been solely by way of example, and the scope of the invention in respect to materials and proportions is defined solely by the following claims.

What I claim is:

1. A steeping tank having a bottom, a discharge pipe in the bottom, a grid supported over the bottom and parallel thereto and having an opening over the pipe, a valve movable upwardly through the pipe into closed position in the plane of the bottom and a grid section mounted on the face of the valve and spaced parallel thereto and being positioned in the plane of the grid when the valve is closed.

2. A steeping tank having a bottom, a discharge pipe in the bottom, an apertured rib on the bottom around the pipe opening, a grid supported on the rib above and parallel to the bottom, a valve movable upwardly through the pipe into closed position in the plane of the bottom and a grid section mounted on the face of the valve and spaced parallel thereto and being positioned in the plane of the grid when the valve is closed.

3. A steeping tank having a bottom, a discharge pipe in the bottom, an apertured rib on the bottom around the pipe opening, a grid supported on the rib above and parallel to the bottom, a valve movable upwardly through the pipe into closed position in the plane of the bottom, a plurality of upstanding lugs on the valve and a grid section mounted on the lugs and being positioned in the plane of the grid when the valve is closed.

4. A steeping tank having a bottom, a discharge pipe in the bottom, an apertured rib on the botom around the pipe opening, a grid supported on the rib above and parallel to the bottom, a valve pivotally carried in the pipe below the bottom and movable upwardly into closed position in the plane of the bottom, and a grid section mounted on the face of valve and spaced parallel thereto and being positioned in the plane of the grid when the valve is closed.

5. A steeping tank having a bottom, a discharge pipe in the bottom, a grid supported over the bottom in spaced relation thereto and having an opening over the pipe, a horizontal hinge pin transversely of the pipe, a pair of lugs on the valve with elongated apertures through which the pin extends, gearing for moving the valve upwardly into closed position in the plane of the tank bottom and a grid section mounted on the face of the valve and spaced parallel thereto and being positioned in the plane of the grid when the valve is closed.

6. A steeping tank having a bottom, a discharge pipe in the bottom, a grid supported over the bottom in spaced relation thereto and having an opening over the pipe, a horizontal hinge pin transversely of the pipe, a lateral chamber opening out of the pipe opposite the pin, a valve pivoted on the pin and movable upwardly into closed position in the plane of the bottom, a grid section spacedly mounted parallel to the face of the valve and positioned in the plane of the grid when the valve is closed, a gear pivotally connected to the valve and to the pin and a pinion for operating the gear to move the valve from upper closed position to lower open position with the gear received in the chamber.

JOSHUA EPSTEIN.

REFERENCES CITED

The following references are of record in the file of this patent:

UNITED STATES PATENTS

| Number | Name | Date |
|---|---|---|
| 390,533 | Toepfer | Oct. 2, 1888 |
| 952,180 | Birsner | Mar. 15, 1910 |
| 1,980,495 | Muir | Nov. 13, 1934 |

FOREIGN PATENTS

| Number | Country | Date |
|---|---|---|
| 833 | Great Britain | of 1875 |
| 12,117 | Great Britain | of 1848 |